D. B. NEAL
Seed-Planter.
No. 18,762.
Patented Dec. 1. 1857.
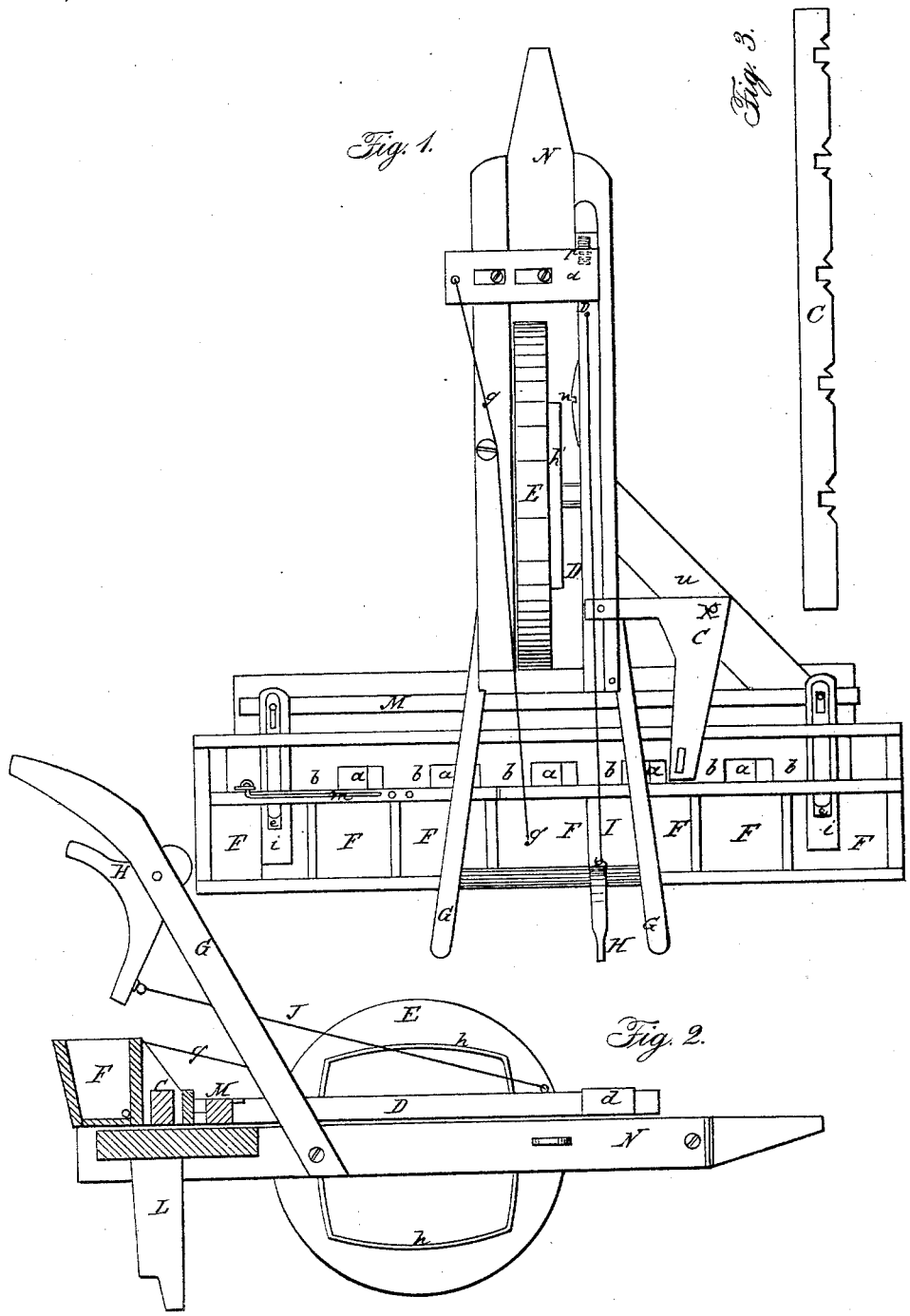

UNITED STATES PATENT OFFICE.

DANIEL B. NEAL, OF MOUNT GILEAD, OHIO.

IMPROVEMENT IN SEED-PLANTERS.

Specification forming part of Letters Patent No. 18,762, dated December 1, 1857.

*To all whom it may concern:*

Be it known that I, DANIEL B. NEAL, of Mount Gilead, Ohio, have invented certain new and useful Improvements in Seed-Planters; and I do hereby declare that the following is a full, clear, and exact description of the same, reference being had to the accompanying drawings, and to the letters of reference marked thereon.

The nature of my invention consists in the arrangement of certain devices, the peculiarities of which will be hereinafter fully described.

In order that those skilled in the arts may manufacture and use my invention, I will proceed to describe its construction and operation.

In the accompanying drawings, which make a part of this specification, Figure 1 is a plan view. Fig. 2 is a side elevation, showing a part in section. Fig. 3 is a view of the vibrating bar for distributing the seed, showing its construction.

In Fig. 1, G are the handles of the machine. F F are the seed-chambers. $a\,a\,a$ are apertures into which the seed passes from the chambers F, and through these apertures to the discharge-spout, and thus to the ground. $b\,b\,b$ are slide-valves formed in one piece, and serve to close or open the apertures $a\,a$, partially or entirely, for the purpose of regulating the amount of seed to be discharged. $i\,i$ are slides having in them an aperture, $e\,e$, for the purpose of conveying the grain from the seed-chamber F into apertures under them corresponding with apertures $a\,a\,a$, and thence through the discharge-spout to the ground. These slides $i\,i$ are attached to the bar M and are operated by it. M is a cross-bar, which is attached to bar D. Said bar D, running forward, serves to convey motion from the driving-wheels to the slides $i$ and the seed-distributing bar. $n$ is a slot in a plate attached to bar D, into which the cam $h$ on the driving-wheel enters. By throwing bar D in the position it now occupies, so that the cam will not act in the slot, the driving-wheel will not operate the slides $i\,i$, and the distributing-bar C. (Seen in Figs. 2 and 3.) J is a rod having a handle, H, attached to it. Said rod J, being attached to bar D, serves to operate it when not operated by the cam on the driving-wheel. $p$ is a roller in the forward end of bar D. Said roller, resting on the frame of the machine, serves to prevent friction, and thus render the machine capable of hand operation. $d$ is a sliding guide resting on the forward portion of the frame, said guide being for the purpose of giving lateral motion to bar D, throwing the machine in and out of gear by means of slot $n$ and cam $h$. $g$ is a lever attached to this guide $d$ for the purpose of operating it, said lever extending back between the handles of the machine. $c$ is a rectangular lever, being pivoted near the angle to a support (marked $u$,) one end of said lever being attached to bar D, while the other is attached to bar C, said lever serving the purpose of giving motion to the distributing-bar C. E is the driving-wheel, and $h$ is a cam on said wheel, for the purpose of operating the seeding portion of the machine when desirable.

In Fig. 2, E is the driving-wheel. $h$ is the cam on said wheel. N is a portion of the frame-work of the machine. G is the handle. H is a handle secured to a spoke between the handles of the machine and attached to rod J, and serves to operate said rod. J is a rod connected at one end to handle H and at the other to the bar D, and serves to operate bar D by hand when not desired to operate it by the driving-wheel. $g$ is a lever for the purpose of giving the bar D lateral motion, throwing in or out of gear. F is the seed-chamber. $o$ is an aperture in said chamber for permitting the seed to pass out. C is the distributing-bar, said bar occupying a position over the slide-valves $b\,b\,b$ and apertures $a\,a\,a$. (Seen in Fig. 1.) M is a cross-bar for the purpose of giving motion to slides $i\,i$ in Fig. 1. L is the discharge-spout. $d$ is the sliding guide for regulating the bar D laterally.

Fig. 3 shows the construction of the distributing-bar C.

In the operation of this machine, the grain is put into the seed-chambers F F F. The machine being set in motion, the bar D is thrown toward the driving-wheel E by means of lever $g$, and the cam $h$ enters the slot $n$ on the plate attached to rod D. Thus motion is communicated to bar D, lever $c$, and distributing-bar C, and also to bar M and slides $i\,i$. The slides $i\,i$ are for the purpose of dropping the grain in hills, being operated when the cam is used as often as the cam changes direction, as will be seen in Fig. 2. C, being for the purpose of drilling the grain, operates in a different manner, being constructed in the manner herein shown, and having a vibratory motion over the apertures $a\ a\ a$, keeps the seed constantly in motion. The seed passes from chamber F through aperture $o$, and entering between the slots and grooves in the bar C is kept constantly pouring out at the discharge-spout L. When not desired to operate these slides and bars by means of the driving-wheel and cam, lever $g$ may be made to throw the machine out of gear, and then it may be operated as often as the operator may desire by means of the handle H and rod J, and corn being placed in the chamber F over slides $i\ i$, may be dropped at any desired distance apart, according to the wishes of the operator.

I do not claim that any of the members of my machine are new; nor do I claim to have been the first who has dropped the grain at pleasure of the operator in a power-planter; but What I do claim as new, and desire to secure by Letters Patent, is—

The peculiar arrangement of handle H, rod J, bars D, M, and C, slides $i\ i$, and lever $c$, when used in the manner and for the purpose herein described.

DANIEL B. NEAL.

Witnesses:
    T. H. DALRYMPLE,
    A. J. THOMPSON.